March 5, 1957
L. LA HOOD
2,784,041
DETACHABLE SERVICE TRAY FOR AUTOMOBILE DOORS
Filed Aug. 11, 1955
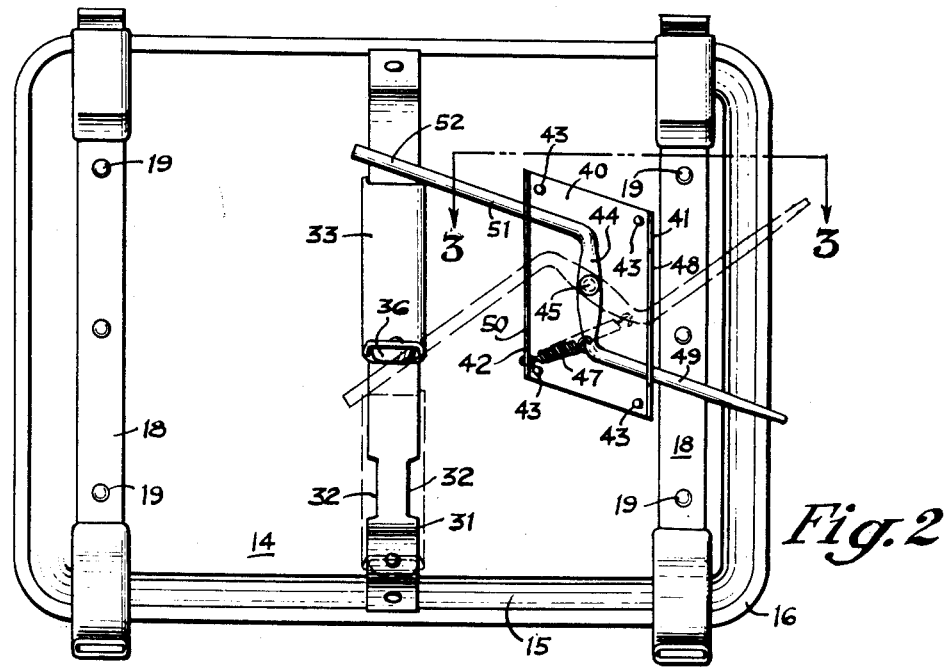
Fig. 2
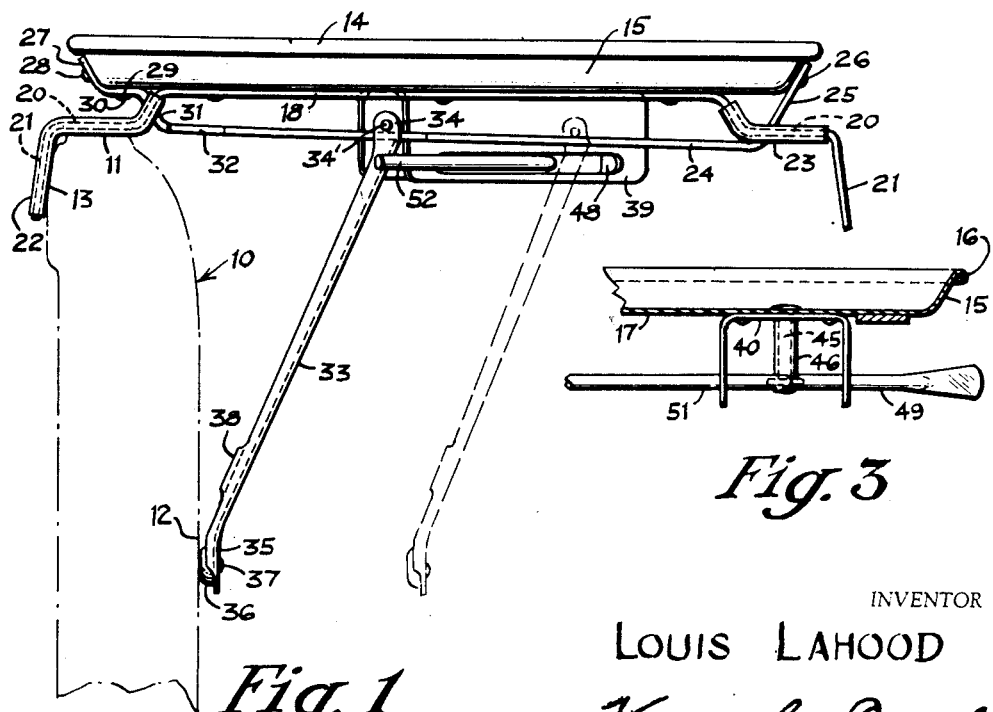
Fig. 3
Fig. 1
INVENTOR
LOUIS LAHOOD
BY *Kimmel & Crowell*
ATTORNEYS 2,784,041
Patented Mar. 5, 1957

2,784,041

DETACHABLE SERVICE TRAY FOR AUTOMOBILE DOORS

Louis La Hood, Peoria, Ill.

Application August 11, 1955, Serial No. 527,837

3 Claims. (Cl. 311—22)

The present invention relates to attachment for service trays, and more particularly to service trays which are adapted to be attached to vehicle doors in drive-in refreshment stands.

The attachment herein described is adapted for use with service trays of the type disclosed in the patent to W. L. McGinley, 1,934,271, issued November 7, 1933.

The primary object of the invention is to provide a service tray attachment which will permit the service tray to be attached and adjusted to the door by the waitress without removing her hands from the normal carrying position on the tray.

Another object of the invention is to provide a service tray attachment of the class described in which means are provided for positively moving a brace on the service tray to position to engage the outside of the car door.

A further object of the invention is to provide a service tray attachment in which the service tray supporting brace is moved by a remotely controlled lever system.

A still further object of the invention is to provide a structure of the class described above which will be inexpensive to manufacture, convenient to attach and light in weight to facilitate its use by a waitress of a drive-in refreshment stand.

Other objects and advantages will become apparent in the following specification when considered in the light of the attached drawings, in which:

Figure 1 is a side elevation of the invention;

Figure 2 is a bottom plan view of the invention, and

Figure 3 is a fragmentary transverse cross section of the invention taken along the line 3—3 of Figure 2, looking in the direction of the arrows.

Referring now to the drawings in detail wherein like reference numerals indicate like parts throughout the several figures, the reference numeral 10 indicates generally the upper portion of a vehicle door illustrated in broken lines. The door 10 has a window sill 11, an outer panel 12 and an inner window trim member 13. The vehicle door 10 is of conventional construction and is intended to represent the vehicle door of any vehicle.

A serving tray 14 is provided with upwardly flared side walls 15 terminating in an outwardly rolled reverted edge 16. A bottom wall 17 supports the outwardly and upwardly flared side wall 15 and carries a pair of transversely extending leg-carrying straps 18 which are secured by rivets 19 or the like to the underside of the bottom wall 17 adjacent the opposite ends thereof. The leg-carrying straps 18 are provided with downwardly offset portions 20 which extend parallel to the straps 18 and which carry downwardly-extending legs 21 which flare slightly outwardly. One of the legs 21 is covered by a rubber sheath 22 which encompasses the leg 21, the downwardly offset portions 20 and extends upwardly to the strap 18, while the downwardly offset portions 20 on the opposite end of the leg-carrying strap 18 is encompassed by a somewhat shorter rubber sheath 23 which terminates at the beginning of the leg 21, leaving the leg 21 at this end of the strap 18 exposed. The legs 21, covered by the rubber sheath 22, are positioned on the same side of the tray 14 and are adapted to have their downwardly offset portions 20 engaging the window sill 11 and the leg 21 engaging the window trim 13 of the car door 10. The legs 21 on the four corners of the tray 14 are adapted to support the tray on the counter of the refreshment stand while the food is being placed thereon. The rubber sheath 22 covering the offset portion 20, at one end of the strap 18, and the rubber portion 23 covering the offset portion 20, at the opposite end of the strap 18, are adapted to engage the rolled edge 16 of a tray 14 when they are in a stacked relationship, with the rubber sheath 22 and rubber sheath 23 protecting the lowermost tray 14 from injury by the uppermost tray 14.

A brace support 24 is secured to the tray 14 in spaced-apart relation below the bottom wall 17 thereof by means of an upwardly extending arm 25 at one end, which is riveted at 26 or otherwise secured to the side wall 15 of the tray 14, while the opposite end 27 is riveted as at 28 or otherwise secured to the opposite side wall 15. The end 27 of the brace-carrying support 24 is bent as at 29 to underlie a portion of the bottom wall 17 to which it is secured by means of rivet 30, or other suitable securing element.

An upstanding portion 31 extends from the bent portion 29 to the brace support 24 and acts to space this end of the brace 24 from the bottom wall 17 of the tray 14. The brace 24 extends parallel to the leg-carrying straps 18 and is centrally positioned therebetween. The brace 24 is notched inwardly at 32 from each side, as best shown in Figure 2, adjacent the upstanding portion 31 for a purpose to be later described.

A brace 33 is formed in a generally channel shape and has a pair of parallel ears 34 extending from one end thereof, the opposite end 35 thereof being bent downwardly at an angle to the member 33 and carries a rubber bumper 36 on the outer end thereof, which is secured thereto by means of a rivet 37 or the like. The ears 34 extend upwardly on opposite sides of the brace support 24 and are secured thereto by means of a pin 34' extending between the ears 34 above the brace support 24. The upper end 33' of the bight of the channel member 33 is adapted to cooperate with the pin 34' to lock in a camming fashion to the brace support 24 upon outward movement of the lower end 35 of the brace 33. The brace 33 is provided with a pair of inwardly-extending lugs 38 which are adapted to be moved through the notches 32 upon swinging the brace 33 to a position generally parallel to the bottom 17 of the tray 14, and then to engage over the top edge of the brace support 24 upon sliding the brace toward the end 25 of the brace support 24. With the lugs 38 engaged over the top of the edges of the brace support 24, the brace is supported in a generally parallel position with relation to the tray 14 so that it does not interfere with the stacking of the trays 14 or the placement of the tray 14 on a counter.

The construction described heretofore of the tray 14 is of a conventional nature as shown in the aforementioned McGinley patent and forms the device to which the invention is attached.

A channel guide plate 39 comprises a base portion 40, a flange 41 extending perpendicular to the base 40 on one side edge thereof, and a second flange 42, extending perpendicularly on the base 40 on the opposite side edge to the flange 41, is attached to the underside of the bottom 17 of the tray 14 by means of rivets 43 or the like. The guide member 39 is positioned between one of the leg-carrying straps 18 and the brace support 24 adjacent the leg-carrying strap 18. A lever 44 is pivoted on a pivot 45 extending through the base 40 of the guide plate 39 and is spaced apart therefrom by a bushing 46. The lever 44 is biased at one end thereof toward the flange 42 by means of a coil spring 47 which extends between the flange 42 and one end of the lever 44. The flange 41 is provided with a slot 48 extending parallel to the base 40 thereof, and the lever 44 is provided with a handle portion 49 which extends through the slot 48 at a substantial angle to the lever 44. The flange 42 is likewise provided with a slot 50 which also extends parallel to the base 40 and has a brace-operating rod 51 extending therethrough from the lever 44. The lever 44, handle 49 and brace-operating rod 51 are formed integrally with the handle 49 and the brace-operating rod 51 extending substantially parallel to each other.

The outer end 52 of the brace-operating rod 51 underlies the brace support 24 and is adapted to engage the brace 33 adjacent its upper end so that movement of the handle 49, in a direction away from the notches 32, will cause the outer end 52 of the brace-operating rod 51 to engage the brace 33 moving it so that the lugs 38 reach the notches 32, whereupon the brace 33 will fall due to gravity to a position as generally indicated in dotted lines in Figure 1 of the drawings. Upon further movement of the handle 49, the brace 33 is positioned against the outer panel 12 of the door 10 and the upper portion will be locked to the brace support rod 24.

With the legs 21 in engagement with the trim 13 of the window sill 11, the tray 14 will then be securely fastened to the vehicle door 10. The spring 47 will return the handle 49 and the brace-operating rod 51 to their original positions, and the brace 33 will be released from its bracing position upon raising of the tray 14 in the normal manner.

In the use and operation of the invention, the brace 33 is normally supported in a position generally parallel to the bottom wall 17 of the tray 14 and it is necessary for the waitress to remove one hand from the tray to disengage the free end portion of the brace 33 to permit it to engage the vehicle door 10. She must then press inwardly on the upper end of the brace 33 to lock the brace to the brace support 24. During this period the tray 14 must be handled and balanced by one hand. It can be readily seen that with the present invention the waitress can move the brace 33 from stored position to bracing position and then lock the brace on the car door merely by moving the lever handle 49 without removing either hand from the tray 14.

Having thus described the preferred embodiment of the invention, it should be understood that numerous modifications and adaptations may be resorted to without departing from the scope of the appended claims.

What is claimed is:

1. An attachment for serving trays of the type having means for engaging a vehicle window sill and a slidable brace for engaging the side of the vehicle below said window sill comprising, a bracket, means securing said bracket to said tray in depending relation adjacent said brace, a lever, means on said bracket pivotally securing said lever thereto in parallel spaced relation to said tray, means on said bracket supporting and guiding said lever, spring means extending from said bracket to said lever normally biasing said lever in one direction, and a handle formed on one end of said lever for moving said lever in the opposite direction, said lever being positioned to engage and move said brace into vehicle engaging position when actuated through said handle.

2. A device as claimed in claim 1 wherein said means supporting and guiding said lever is arranged on opposite sides of said bracket supporting and guiding opposite ends of said lever.

3. A device as claimed in claim 1 wherein said means on said bracket pivotally securing said lever thereto comprises a depending post and means on the lower end of said post pivotally securing said lever thereon.

References Cited in the file of this patent

UNITED STATES PATENTS

| | | |
|---|---|---|
| 1,240,962 | Frank | Sept. 25, 1917 |
| 1,451,846 | Robinson | Apr. 17, 1923 |
| 1,557,262 | McGee | Oct. 13, 1925 |
| 1,565,748 | Monschke | Dec. 15, 1925 |
| 1,580,619 | McGee | Apr. 13, 1926 |
| 1,700,834 | Farr | Feb. 5, 1929 |
| 1,924,223 | Weatherly | Aug. 29, 1933 |
| 1,934,271 | McGinley | Nov. 7, 1933 |
| 2,533,173 | Mitchell | Dec. 5, 1950 |
| 2,723,173 | McBride | Nov. 8, 1955 |